United States Patent [19]

Taka et al.

[11] Patent Number: 5,051,481

[45] Date of Patent: Sep. 24, 1991

[54] LOW-TEMPERATURE HEAT-SHRINKABLE FILM

[75] Inventors: Toshio Taka; Takuo Okubo, both of Kawasaki; Keiitsu Kobayashi, Niihari; Takehiko Asano, Niihari; Yoshio Kawasaki, Niihari; Kiyotaka Osanai, Niihari, all of Japan

[73] Assignees: Showa Denko K. K.; Taisei Polymer Co., both of Tokyo, Japan

[21] Appl. No.: 378,873

[22] Filed: Jul. 12, 1989

[30] Foreign Application Priority Data

Jul. 12, 1988 [JP] Japan .................................. 63-172978

[51] Int. Cl.$^5$ .......................... C08J 5/18; C08L 23/18; C08L 23/16; C08L 23/08
[52] U.S. Cl. .................................. 525/240; 526/348.1
[58] Field of Search .......................................... 525/240

[56] References Cited

U.S. PATENT DOCUMENTS 4,352,849 10/1982 Mueller ................................ 428/516
4,536,549 8/1985 Hattori et al. ....................... 525/240

FOREIGN PATENT DOCUMENTS 58-011536 1/1983 Japan .
59-041342 3/1984 Japan .
59-202244A 11/1984 Japan .

Primary Examiner—Carman J. Seccuro
Attorney, Agent, or Firm—Sughrue, Mion, Zinn, Macpeak & Seas

[57] ABSTRACT

A low-temperature heat-shrinkable film having a haze value not larger than 8%, a heat shrinkability in the machine direction at a temperature of 90° C. of at least 30%, and a shrinkage stress of at least 300 g/mm$^2$, is made from a composition comprising (a) a linear ethylene polymer containing short-chain branches and having a density not larger than 0.940 g/cm$^2$ and (b) an ethylene/propylene random copolymer containing 3.5 to 10% by weigh of units derived from ethylene, wherein the proportion of the ethylene/propylene random copolymer in the composition is 15 to 50% by weight.

7 Claims, No Drawings

LOW-TEMPERATURE HEAT-SHRINKABLE FILM

BACKGROUND OF THE INVENTION

1. Field of the Invention

The present invention relates to a low-temperature heat-shrinkable film having a high heat shrinkability and a large shrinkage stress at a low temperature, having an excellent transparency, and having a broad heat-sealing temperature range wherein a good heat-sealing strength is maintained. More particularly, the present invention relates to a low-temperature heat-shrinkable film which is valuable for use as shrinkable packaging film when a high temperature must not be applied to a material to be packaged, a large shrinkage stress is required for tightly binding a material to be packed, a transparency is required to allow a packaged material to be displayed or a heat sealing finish is desired.

2. Description of the Related Art

Conventional heat-shrinkable films, for example, heat-shrinkable films made of polyvinyl chloride or polypropylene usually begin to shrink at about 100° C., and a shrinkage as large as 50 to 70% occurs at about 130° C. Nevertheless, these heat-shrinkable films have a heat-sealing strength lower than that of a heat-shrinkable film made of polyethylene.

A high-pressure low-density polyethylene resin is usually used for a heat shrinkable film. The melting point of this resin is about 110° C., and therefore, a film of this resin is disadvantageous when compared with heat-shrinkable films made of polyvinyl chloride or polypropylene, in that it is impossible to obtain a large shrinkage stress at a shrinking temperature of about 130° C. and the binding force is not tight enough.

SUMMARY OF THE INVENTION

A primary object of the present invention is to overcome the above-mentioned defects of the conventional heat-shrinkable films and provide a low-temperature heat-shrinkable film having an excellent low-temperature heat-shrinkability, a good tight binding force with a high shrinkage stress, a high transparency, and a high heat-sealing strength.

In accordance with the present invention, there is provided a low-temperature heat-shrinkable film made of a composition comprising (a) a linear ethylene polymer containing short-chain branches and having a density not larger than 0.940 g/cm$^3$ and (b) an ethylene/propylene random copolymer containing 3.5 to 10% by weight of units derived from ethylene, wherein the proportion of the ethylene/propylene random copolymer in the composition is 15 to 50% by weight, the haze value of the heat-shrinkable film is not larger than 8%, the heat shrinkability in the machine direction at a temperature of 90° C. is at least 30%, and the shrinkage stress is at least 300 g/mm$^2$.

DESCRIPTION OF THE PREFERRED EMBODIMENTS

The low-temperature heat-shrinkable film of the present invention will now be described.

(A) Linear Ethylene Polymer Containing Short-Chain Branches

The linear ethylene polymer containing short-chain branches, used in the present invention, is a copolymer of ethylene with a small proportion of an α-olefin having 3 to 12 carbon atoms such as, for example, propylene, butene-1, hexene-1, 4-methylpentene-1 or octene-1. The density of the linear polyethylene is not higher than 0.940 g/cm$^3$, preferably 0.880 to 0.940, more preferably 0.910 to 0.935 g/cm$^3$. If a linear ethylene polymer (hereinafter referred to as "LLDPE") containing short-chain branches and having a density higher than 0.940 g/cm$^3$ is used, the transparency and low-temperature shrinkability become unsatisfactory. The proportion of the α-olefin to ethylene is preferably such that the number of pendant alkyl groups in the copolymer is about 1 to about 70, more preferably 3 to 40, per 1,000 carbon atoms in the main chain of the copolymer.

The melt flow rate (MFR) as determined under the conditions of a temperature of 190° C. and a load of 2.16 kg according to JIS K-7260 is usually 0.05 to 50 g/10 min, preferably 0.1 to 20 g/10 min and more preferably 0.1 to 10 g/10 min. If LLDPE having an MFR value smaller than 0.05 g/10 min is used, the blendability and film processability are unsatisfactory, and if LLDPE having an MFR value larger than 50 g/10 min is used, the mechanical strength of the obtained film is too low.

(B) Ethylene/Propylene Random Copolymer

The ethylene/propylene random copolymer used in the present invention has an ethylene content of 3.5 to 10% by weight and preferably 4.0 to 7.0% by weight. If an ethylene/propylene random copolymer (hereinafter referred to as "R-PP") having an ethylene content lower than 3.5% by weight is used, the heat shrinkability of the film at a low temperature as well as the heat sealability and transparency thereof are unsatisfactory. If R-PP having an ethylene content higher than 10% by weight is used, since the rate of solidification is low at the film-forming step, the formation of a film is not stable.

The melt flow rate (MFR) as determined under the conditions of a temperature of 230° C. and a load of 2.16 kg according to JIS K-7260 of this R-PP is preferably 0.5 to 10 g/10 min and more preferably 1.0 to 8.5 g/10 min. If R-PP having an MFR value smaller than 0.5 g/10 min is used, the film-forming processability is unsatisfactory, and if R-PP having an MFR value larger than 10 g/10 min is used, the mechanical strength of the film is too low.

(C) Composition

In the composition used for preparing the low-temperature heat-shrinkable film of the present invention, the ratio of R-PP to the total amount of LLDPE and R-PP is 15 to 50% by weight. If the proportion of R-PP is lower than 15% by weight, the heat sealability is poor. If the proportion of R-PP in the composition is larger than 50% by weight, the low-temperature shrinkability of the obtained film is unsatisfactory and the transparency is poor.

(D) Preparation of Composition

The composition of the present invention is prepared by dry-blending LLDPE and R-PP at the above-mentioned ratio by a customarily used mixer, for example, a Henschel mixer, or by melt-kneading LLDPE and R-PP at the above-mentioned ratio by a mixer such as a Banbury mixer, a kneader, a roll mill or a screw type extruder. When LLDPE and R-PP are first dry-blended and the obtained mixture is melt-kneaded, an extremely homogeneous composition can be obtained.

High pressure polyethylene or a high pressure ethylene copolymer, which has long chain branches, may be incorporated in a small amount into the composition of the present invention to enhance the film processability thereof.

Additives customarily used in the field of olefin polymers, such as stabilizers against oxygen, heat and ultraviolet rays, metal deterioration preventing agents, flame retardants, colorants, electric characteristic improvers, antistatic agents, lubricants, processability improvers and tackifiers, can be added according to need, so long as the characteristics of the composition obtained are not adversely affected thereby.

(E) Preparation of Film

The film of the present invention can be prepared from the composition prepared in the above-mentioned manner by a conventional air-cooling inflation process in which air is blown onto the circumference of a tubular extrudate and the tubular extrudate is then naturally cooled to be formed into a tubular film, but a process in which a greater cooling effect is obtained is preferred. The known rapid cooling processes such as the water-cooling inflation process in which a tubular extrudate is placed directly in contact with water to effect cooling and the chill roll process in which a cooling roll (chill roll) is used, are preferably adopted whereby a film having a further improved transparency can be obtained.

The drawing temperature for preparing the low-temperature heat-shrinkable film is not critical, but if the drawing temperature is 70° to 100° C., especially about 90° C., an excellent low-temperature heat shrinkability can be obtained.

The low-temperature heat-shrinkable film of the present invention has a haze value not larger than 8%, a shrinkage ratio in the machine direction at a heating temperature of 90° C. of at least 30%, and a shrinkage stress of at least 300 g/mm$^2$. If the haze value of the film exceeds 8%, the packaged material is not properly displayed, and if the shrinkage ratio of the film in the machine direction at a heating temperature of 90° C. is lower than 30%, the adhesion of the film to a packaged material after heat shrinkage is poor, and wrinkles are formed. If the shrinkage stress of the film is lower than 300 g/mm$^2$, when a material is collected in a stack and packaged, the binding force is not tight enough to prevent disjointing, and in the case of a package having a sleeve opening, the appearance of the sleeve opening is bad.

The low-temperature heat-shrinkable film of the present invention has the following merits.

(1) Since the heat shrinkability at a low temperature is excellent, the film can be effectively used for packaging a material to which a high temperature must not be applied.

(2) Since the shrinkage stress is high, a good tight binding is obtained when a material is shrinkage-packaged.

(3) The film has an excellent transparency compared with a heat-shrinkable film composed of high-pressure low-density polyethylene customarily used for a heat-shrinkable film, and the transparency of the film is comparable to that of a heat-shrinkable film composed of polypropylene or polyvinyl chloride, and therefore, an excellent display can be obtained.

(4) Where the film is passed through a shrink tunnel for heat shrinkage, the heat-sealed portion is not broken. In other words, the heat-sealing temperature range is broad enough for maintaining a desired heat-sealing strength and the heat-sealing strength is high enough for a shrinkage process at a high temperature.

(5) The heat-sealed portion is not broken by handing after the shrinkage packaging process is completed.

The present invention will now be described with reference to the following examples and comparative examples.

In the examples and comparative examples, the haze, heat shrinkability, heat sealability and shrinkage stress were determined by the following methods.

Haze

The haze was measured according to ASTM D-1003.

Heat Shrinkability

The heat shrinkability was measured according to JIS Z-1703.

Heat Sealability (I)

A strip-shaped test piece having a width of 15 mm was cut from a sample film and was heat sealed under the conditions of a sealing pressure of 2 kg/cm$^2$ and a sealing time of 1 second. The sealing temperature at which a heat sealing strength higher than 1.5 kg/15 mm width was obtained when the heatsealed test piece was peeled at a pulling speed of 50 cm/min in the direction of 180° was measured.

Heat Sealability (II)

In the method of determining the heat sealability, the sealing temperature was elevated, and the highest sealing temperature was measured at which the strength of the sealed portion was maintained at a level of at least 1.5 kg/15 mm width before the fusion.

Heat Sealability (III)

This value indicates the heat-sealing temperature range between the above-stated two sealing temperatures of (I) and (II).

Shrinkage Stress

The temperature in an Instron tensile tester was elevated at a rate of 3° C. per minute, and the shrinkage stress in the machine direction was measured at 90° C.

The physical properties of the linear polyethylene having a density not larger than 0.940 g/cm$^3$ and containing short-chain branches and the ethylene/propylene random copolymer having an ethylene content of 3.5 to 10% by weight, as used in the examples and comparative examples, are described below.

(A) Linear Polyethylene Having Density Not Larger Than 0.940 g/cm$^3$ and Containing Short-Chain Branches An ethylene/butene-1 copolymer having a density of 0.920 g/cm$^3$, 15 pendant alkyl groups per 1,000 carbon atoms in the main chain thereof, and an MFR value of 0.8 g/10 min [LLDPE] was used.

(B) Ethylene/Propylene Random Copolymer Having Ethylene Content of 3.5 to 10% by Weight (1) An ethylene/propylene copolymer having an ethylene content of 4.3% by weight and an MFR value of 1.8 g/10 min [R-PP(1)] was used.

(2) An ethylene/propylene copolymer having an ethylene content of 6.5% by weight and an MFR value of 1.8 g/10 min [R-PP(2)] was used.

Examples 1 through 4 and Comparative Examples 1 through 3

LLDPE and R-PP(1) or R-PP(2) were dry-blended at a mixing ratio shown in Table 1 in a Henschel mixer for 6 minutes (Examples 1 through 4 and Comparative Examples 1 and 2).

TABLE 1

|  | Resin Component (A) | | Resin Component (B) | |
| --- | --- | --- | --- | --- |
|  | Kind | Amount incorporated (% by weight) | Kind | Amount incorporated (% by weight) |
| Example 1 | LLDPE | 70 | R-PP(1) | 30 |
| Example 2 | LLDPE | 50 | R-PP(1) | 50 |
| Example 3 | LLDPE | 70 | R-PP(2) | 30 |
| Example 4 | LLDPE | 50 | R-PP(2) | 50 |
| Comparative Example 1 | LLDPE | 90 | R-PP(1) | 10 |
| Comparative Example 2 | LLDPE | 40 | R-PP(1) | 60 |
| Comparative Example 3 | LDPE* | 100 | — | — |

*LDPE: a low-density polyethylene homopolymer (MFR = 3.1 g/10 min) prepared by the high-pressure method was used.

The obtained compositions and LDPE were formed into films by the air-cooling inflation process while being properly cooled and the obtained films were drawn at a film take-out speed of 10 m/min, a take-up speed of 40 m/min (22 m/min in Comparative Example 3) and a drawing temperature of 90° C., to obtain drawn films having a thickness of 40 microns and a width of 600 mm. The physical properties of the obtained films are shown in Table 2.

TABLE 2

|  | Draw ratio | Haze value (%) | Heat shrinkability | | Heat sealability (°C.) | | | Shrinkage stress (g/mm$^2$) |
| --- | --- | --- | --- | --- | --- | --- | --- | --- |
|  |  |  | 90° C. | 100° C. | (I) | (II) | (III) |  |
| Example 1 | 3.3 | 2.9 | 40 | 50 | 150 | 200 | 50 | 430 |
| Example 2 | 3.3 | 4.0 | 35 | 45 | 152 | 210 | 58 | 400 |
| Example 3 | 3.3 | 2.2 | 43 | 52 | 145 | 190 | 45 | 420 |
| Example 4 | 3.3 | 3.4 | 38 | 48 | 147 | 195 | 48 | 390 |
| Comparative Example 1 | 3.3 | 2.5 | 43 | 58 | 143 | 170 | 27 | 470 |
| Comparative Example 2 | 3.3 | 6.8 | 24 | 40 | 160 | 220 | 60 | 350 |
| Comparative Example 3 | 2.2 | 8.5 | 33 | 45 | 125 | 200 | 75 | 390 |

From the results obtained from the examples and comparative examples, it is seen that the film obtained according to the present invention has an excellent heat shrinkability at a relatively low temperature, a large shrinkage stress, a good transparency, and excellent heat-sealing characteristics i.e., high sealing strength and broad sealing temperature range).

The low-temperature heat-shrinkable film of the present invention provides the following effects. Due to the specified composition, the draw ratio of the film (the drawing suitable for the preparation of the film of the present invention is short-section drawing whereby the drawing section is shortened to reduce neck-in of the film) can be increased to 3 to 6, and a film having a reduced thickness unevenness can be obtained by a uniform drawing. Since the draw ratio can be increased to at least 3, the transparency is greatly improved, with this draw ratio as the boundary, and thus the haze is smaller than 10%. Furthermore, the film has a high shrinkability such that the heat shrinkage in the machine direction at 90° C. is at least 30%, and the shrinkage stress is at least 300 g/mm$^2$, and the film provides a very tight binding. If the draw ratio is lower than 3, the drawing unevenness is large and the problem of thickness unevenness arises, and the transparency is poor. If the draw ratio exceeds 6, draw breaking readily occurs and stable production becomes difficult, and a film having desirable characteristics cannot be obtained.

Since the low-temperature heat-shrinkable film of the present invention is formed from the composition utilizing the difference of the melting point between LLDPE and R-PP, the heat-sealing strength can be increased and the heat-sealing temperature range can be broadened while maintaining the heat shrinkability, heat shrinkage stress, and transparency at high levels.

Polyvinyl chloride or polypropylene has been used for the formation of films having a very high transparency and an excellent low-temperature shrinkability, and a polyethylene resin has not been used. Nevertheless, the film of the present invention has an excellent transparency comparable to that of the polyvinyl chloride or drawn polypropylene film and has excellent heat shrinkage characteristics while retaining the excellent characteristics of polyethylene such as heat sealability, flexibility, and food and use safety.

We claim:

1. A low-temperature heat-shrinkable film comprising a stretched film made of a composition comprising (a) a linear ethylene polymer containing short-chain branches and having a density not larger than 0.940 g/cm$^3$ and (b) an ethylene/propylene random copolymer containing about 4 to 10% by weight, based on the weight of the random copolymer, of units derived from ethylene, wherein the proportion of the ethylene/propylene random copolymer in the composition is 15 to 50% by weight; said stretched film having a haze value of not larger than 8%, a heat shrinkability in the machine direction at a temperature of 90° C. of at least 30%, and a shrinkage stress of at least 300 g/mm$^2$.

2. The film according to claim 1, wherein the linear ethylene polymer is a copolymer of ethylene and an α-olefin of 3 to 12 carbon atoms, having a density of 0.880 to 0.940.

3. The film according to claim 1, wherein the linear ethylene polymer is a copolymer of ethylene and an α-olefin of 3 to 12 carbon atoms, having a density of 0.910 to 0.935 g/cm$^3$.

4. The film according to claim 1, wherein the linear ethylene polymer has a melt flow rate of 0.05 to 50 g/10 min., as determined at a temperature of 190° C. under a load of 2.16 kg.

5. The film according to claim 1, wherein the linear ethylene polymer has a melt flow rate of 0.1 to 20 g/min., as determined at a temperature of 190° C. under a load of 2.16 kg.

6. The film according to claim 1, wherein the ethylene/propylene random copolymer contains 4.0 to 7.0% by weight of units derived from ethylene.

7. The film according to claim 1, wherein the ethylene/propylene random copolymer has a melt flow rate of 0.5 to 10 g/10 min., as determined at a temperature of 230° C. under a load of 2.16 kg.

* * * * *